F. W. DERBY & H. KAISER.
PISTON FOR EXPLOSIVE ENGINES.
APPLICATION FILED MAY 11, 1912.

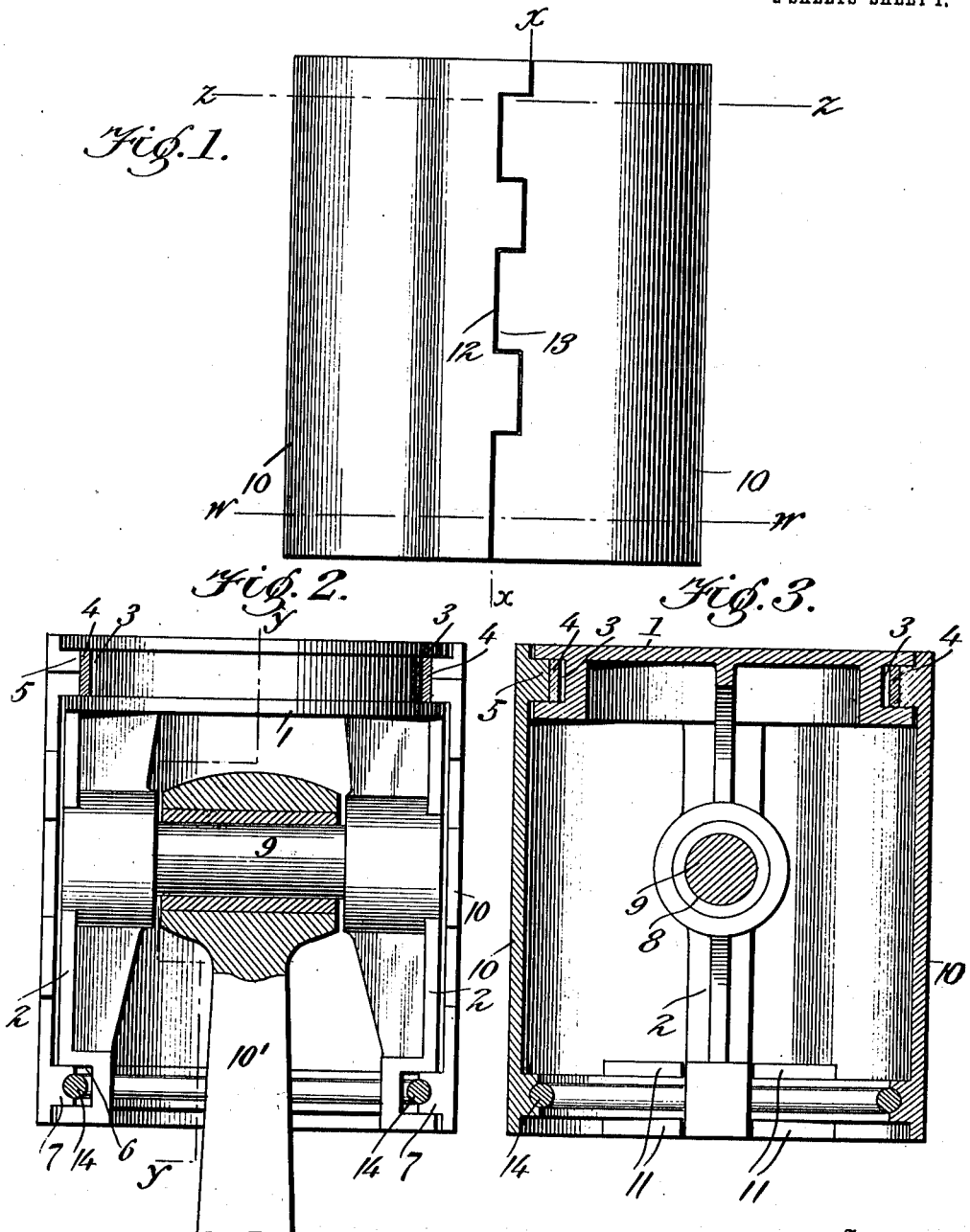

1,053,790.

Patented Feb. 18, 1913.
2 SHEETS—SHEET 2.

Witnesses
Inventors
Frank W. Derby
Herman Kaiser
By Victor J. Evans
Attorney

UNITED STATES PATENT OFFICE.

FRANK W. DERBY AND HERMAN KAISER, OF OAKLAND, CALIFORNIA.

PISTON FOR EXPLOSIVE-ENGINES.

1,053,790.  Specification of Letters Patent.  Patented Feb. 18, 1913.

Application filed May 11, 1912. Serial No. 696,656.

*To all whom it may concern:*

Be it known that we, FRANK W. DERBY and HERMAN KAISER, citizens of the United States, residing at Oakland, in the county of Alameda and State of California, have invented new and useful Improvements in Pistons for Explosive-Engines, of which the following is a specification.

The piston as generally constructed for use in an explosive engine comprises a solid or one piece structure having annular grooves in its outer walls in which are fitted expansible rings so as to maintain a tight joint with the inner walls of the cylinder.
This construction is objectionable because of the unequal wear upon the inner walls of the cylinder, with the result that a leak and waste of power occurs and moreover the piston frequently becomes stuck in the cylinder owing to unequal expansion. And furthermore in two-cycle engines having large port openings the rings frequently interfere and catch upon the walls of the cylinder at the sides of the ports, thereby producing disastrous results.

The present invention provides a piston embodying a frame and a shell, the latter being sectional or expansible so as to be self-adjusting and at all times maintain a close fit with the inner walls of the cylinder. A piston of this type insures an even and uniform wear of the cylinder walls and prevents sticking of the piston because of the self-adaptation of the piston to the cylinder and moreover the piston is admirably adapted for the cylinders of two-cycle engines, since it is immaterial as to the size of the ports because there are no projecting parts liable to catch on the parts of the cylinder walls adjacent the said ports.

The invention consists of the novel features, details of construction and combination of parts, which hereinafter will be more particularly set forth, illustrated in the accompanying drawings, and pointed out in the appended claims.

Figure 4:
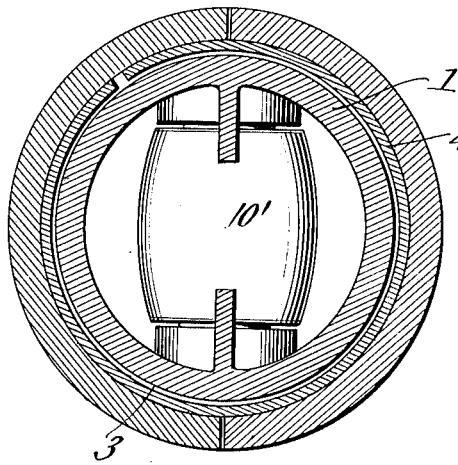
Figure 5:
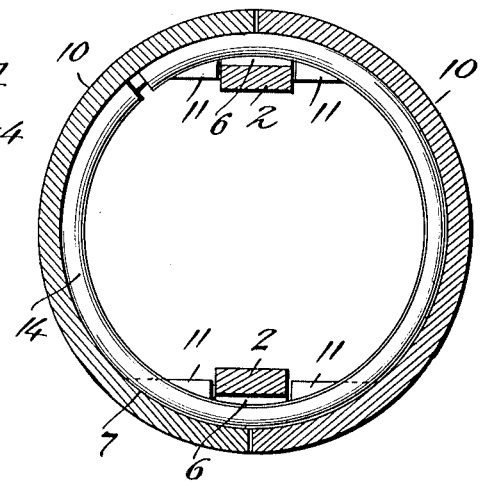
Figure 6:
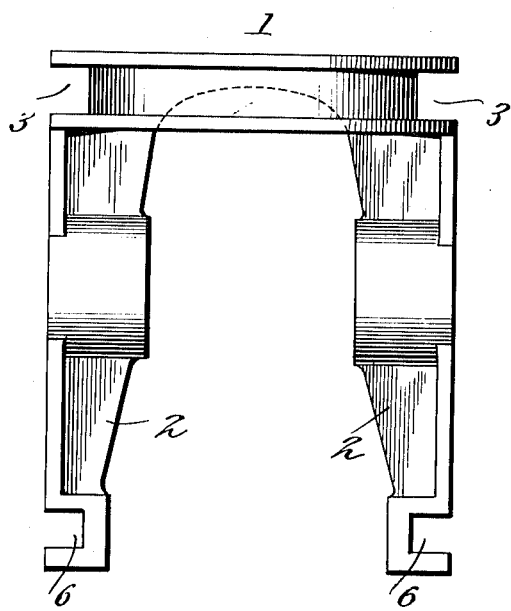

Referring to the drawings, forming a part of the specification, Figure 1 is a side view of a piston embodying the invention. Fig. 2 is a vertical section on the line x—x of Fig. 1, following the joint between the parts and showing the piston frame in full lines. Fig. 3 is a section on the line y—y of Fig. 2. Fig. 4 is a horizontal section on the line z—z of Fig. 1. Fig. 5 is a horizontal section on the line w—w of Fig. 1. Fig. 6 is a front view of the piston frame.

Corresponding and like parts are referred to in the following description, and indicated in all the views of the drawings, by the same reference characters.

In its broad aspect the invention contemplates a piston embodying essentially two parts, a frame and a shell, the latter being expansible and having overlapping parts at the joint to prevent leakage. The component parts of the piston may vary structurally according to the specific purpose for which the piston is designed and according to the character of the work for which the piston is intended.

As illustrated in the accompanying drawings the frame of the piston embodies a head 1 and side members 2, the head 1 being of circular form and the side members 2 being oppositely disposed and of similar formation. The parts of the frame are preferably of integral formation, being elements of a single casting, thereby avoiding joints and insuring the provision of a stable structure. The head 1 has an annular groove 3 which receives an expansion ring 4 and a rib or annular projection 5 extending inwardly from the piston shell, thereby forming an interlocking joint between the frame and shell. Each of the members 2 has a transverse groove 6 near its lower end in which is fitted an inner rib or flange 7 near the lower end of the piston shell. An opening 8 is had in each of the members 2 to receive the pin 9 by means of which the connecting rod 10 is secured to the piston. The outer ends of the openings 8 are closed by the piston shell, thereby retaining the pin 9 in position and at the same time preventing the ends of the pin from scoring or otherwise injuring the walls of the cylinder.

The piston shell is expansible and necessarily involves a joint and to prevent loss of compression portions of the shell bordering upon the joint overlap, this being indicated most clearly in Fig. 1. In the practical construction of the piston it is preferred to have the shell formed of sections or parts 10. Lugs 11 are formed upon the sections of the shell near the lower ends thereof and a short distance from their meeting edges. The lugs 11 are spaced apart such a distance as to receive the lower ends of the members 2 between them, thereby holding the parts of the shell and the piston frame in fixed relative position. The inner rib or flange 5 is constructed to break joint, thereby insuring a close fit between the part 5 and the groove 3. One of the sections 10 has depressions 12 along its edges and the other section has corresponding projections 13 which enter the depressions 12 and fit snugly therein. The depressions 12 and projections 13 produce the overlapping portions which insure a close fit at the joint between the meeting edges of the sections. The inner rib or projection 7 is grooved to receive an expansion ring 14 which is retained in place thereby and normally exerts an outward pressure to hold the sections of the shell close against the inner walls of the cylinder. The expansion ring 14 supplements the action of the expansion ring 4, the latter being flat, whereas the ring 14 is round in cross section.

The sectional formation of the piston shell admits of the parts being readily constructed and easily assembled. When assembling the parts the connecting rod 10 is placed in position between the members 2 of the piston frame and the pin 9 is passed through the openings 8 of the members 2 and through the eye of the connecting rod. The expansion ring 4 may be placed in the annular groove 3 at any time prior to placing the sections 10 of the piston shell in position about the piston frame. The expansion ring 14 may be placed in position after the sections 10 have been fitted about the piston frame. The expansion rings 4 and 14 are of such a size as to normally press the sections 10 apart so that it is necessary to compress the sections to contract the diameter of the piston when placing the same within the cylinder, the expansion rings normally pressing the sections apart so as to maintain a piston fit between the sections of the shell and the inner walls of the cylinder. It will thus be observed that the piston is self-expansible and in operation insures a uniform wear upon the inner walls of the cylinder so that the chances for escape of compression are reduced to the smallest amount possible. The construction moreover is such as to admit of ready replacement of the connecting pin 9 or the packing of the connecting rod to take up any lost motion and prevent any jar or abnormal noise in the operation of the engine.

It will be understood from the foregoing, taken in connection with the accompanying drawings, that a piston constructed in accordance with this invention is free from packing rings which have proven a source of inconvenience and expense, the piston being ringless and adapted for use not only in engines of the explosive type but in prime movers of any nature and is admirably adapted for use in air compressors, ice machines, valves and other places where pistons are required for use.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention what is claimed as new, is:—

1. A self-expansible piston comprising a frame, an automatically adjustable shell to compensate for wear forming the piston body which is fitted to the frame, and interlocking means between the shell and frame.

2. An expansible piston comprising a frame, and an expansible shell fitted to the frame and having overlapping portions along the joint to insure a close fit and prevent loss of compression.

3. An expansible piston comprising a frame embodying a head and side members, and an expansible shell fitted to the frame and having portions interlocking therewith.

4. An expansible piston comprising a frame embodying a head and side members, and an expansible shell fitted about the frame and having portions interlocking with the head of the frame and provided with inwardly extending lugs to embrace opposite sides of the members of the piston frame to hold the parts in fixed relative position.

5. An expansible piston comprising a frame embodying a head having an annular groove and side members, and an expansible shell having an inner annular projection to enter the annular groove of the head of the piston frame and provided with spaced lugs to embrace opposite sides of the members of the piston frame near their outer ends.

6. An expansible piston comprising a frame embodying a head and side members, the head having an annular groove and the side members provided near their outer ends with transverse depressions, and an expansible shell having inner annular ribs near opposite ends, the one to enter the annular groove of the head of the piston frame and the other to enter the depressions of the side members of said piston frame and said shell being further provided with inwardly extending spaced lugs to embrace opposite sides of the side members of the piston frame above and below the depressions thereof.

7. An expansible piston embodying a frame formed of a head and side members, the latter having transversely alining openings, an expansible shell fitted about the frame and having interlocking connection therewith, said shell having overlapping portions along the joint to maintain a close fit, and said shell further serving to close the outer ends of the openings in the side members of the piston frame to retain the connecting pin in place therein.

8. An expansible piston comprising a frame embodying a head having an annular groove and side members formed with openings and having depressions near their outer ends, a sectional shell fitted about the piston frame and having inner annular ribs near opposite ends, the one to enter the annular groove of the head of the piston frame and the other to enter the depressions near the outer ends of the side members of said piston frame, the last mentioned rib having an annular groove, the sections of the shell having corresponding depressions and projections along their meeting edges to break joint and said sections being further provided with inwardly extending spaced lugs to embrace opposite sides of the side members of the piston frame, and expansion rings, the one fitted in the annular groove of the piston frame head and the other fitted in the annular groove of the rib near the outer or lower end of the piston shell.

In testimony whereof we affix our signatures in presence of two witnesses.

FRANK W. DERBY.
HERMAN KAISER.

Witnesses:
  JOSEPH H. ALFONSO,
  CHARLES S. ELTON.